June 24, 1952 H. E. KARIG 2,601,439
FLUID PRESSURE REGULATOR
Filed Oct. 8, 1948 2 SHEETS—SHEET 2

INVENTOR:
HORACE E. KARIG
BY
ATT'Y

Patented June 24, 1952

2,601,439

UNITED STATES PATENT OFFICE 2,601,439

FLUID PRESSURE REGULATOR

Horace E. Karig, Pasadena, Calif., assignor to the United States of America as represented by the Secretary of the Navy Application October 8, 1948, Serial No. 53,545

1 Claim. (Cl. 50—11)

This invention relates in general to a pressure reduction regulator and is more particularly described as a pilot operated regulator for torpedoes, receiving high pressure air through a starting valve and delivering air under reduced pressure which may be varied and selected as desired.

In pressure regulators heretofore available the designs have been too complicated and too large and heavy with such close tolerances as to make them undesirable for use in torpedoes, as they tend to produce pulsation and instability of operation.

The present invention produces a modulated action by the use of a tapered pilot valve for eliminating violent pressure pulsations without the use of frictional damping, and provides a shorter and more compact arrangement with a continuous flow of air rather than the intermittent off-on type produced by the cylindrical cut-off type of valve.

An important object of the invention is to provide a combined starting and pressure regulating valve assembly in a compact unit which is not complicated or too heavy for use in a restricted space such as may be available in a torpedo.

A further object of the invention is to provide a pressure regulator with inherent stability, eliminating pressure pulsations, and to obtain modulated continuous flow by means of a tapered or conical pilot valve structure.

Still a further object of the invention is to provide a pressure regulator in which a continuous flow at reduced pressure may be controlled at constant value, increased or decreased regardless of the supply pressure variation, by a properly proportioned, differential area of pilot valve seat and stem, with a bleed orifice to provide excess air in the valve stem.

Other objects of the invention will be pointed out in the specification and will be apparent from the accompanying drawings, in which.

Figure 1:
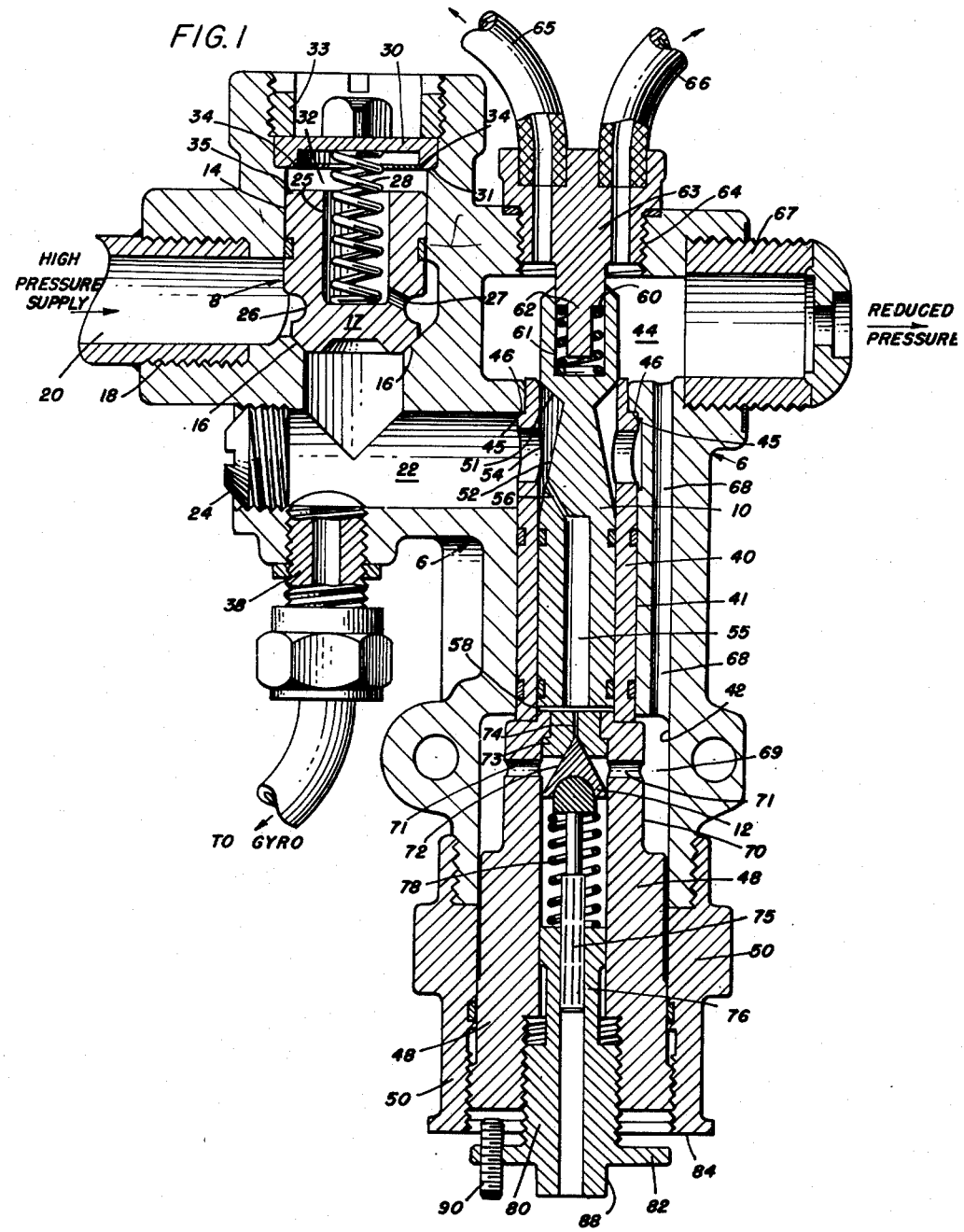
Fig. 1 is a sectional view of a combined pilot valve operated pressure regulator and starting valve in accordance with this invention as employed in a torpedo control system.

In a fluid pressure system for torpedoes it is customary to provide a supply of operating fluid such as air under high pressure as much as 2800 pounds per square inch, and to reduce this to a more usable pressure of 500 or 600 pounds per square inch for operating the various parts of the torpedo. Even the reduced pressure is so high that violent pressure pulsations may result unless the valves and other parts are properly proportioned and connected for equalizing pressures, thus permitting greater tolerances between the parts, and resulting in a more stable operation.

Referring now more particularly to the drawings, a metal reducing valve body 6 is suitably formed by casting and machining to incorporate a starting valve 8 therein and to provide openings and bores for receiving the other valves and cooperating parts. This body is preferably composed of brass, or bronze, but may be made of other metals. The reducing valve comprises a regulating valve 10 which is air operated, and a pilot valve 12 which is operated both by air pressure and spring loading. In its operation, the pilot valve allows pressure to build up or to be bled from under the regulating valve.

The starting valve comprises an end bore 14 with a bottom valve seat 16 and a valve member 17 movable in the bore against the seat. Above the seat is a lateral inlet 18 connected by a pipe 20 with a suitable source of high pressure air supply. Below the seat is a transverse chamber 22 connected to the valve bore 14, extending inwardly to the regulating valve 10, and the outer end closed by a plug 24. In the valve member 17 is a central recess 25 and at the outside is a reduced neck 26 connected to the recess by a pressure equalizing bleed passage 27, and the neck forming a pressure surface tending to raise the valve from its seat.

Seated at one end in the recess 25 is an extended coil spring 28 the other end of which engages a plate 30 seated in the end bore 14 and held tightly against a shoulder 31 to form a starting valve chamber 32 and secured in place by a threaded follower ring 33 in the outer threaded end of the bore. At the inner side of the plate is an upper valve seat 34 engaged by a corresponding inclined seat 35 at the upper end of the valve member 17 to act as a stop to check the opening movement of the valve piston without burring the edge.

Figure 2:
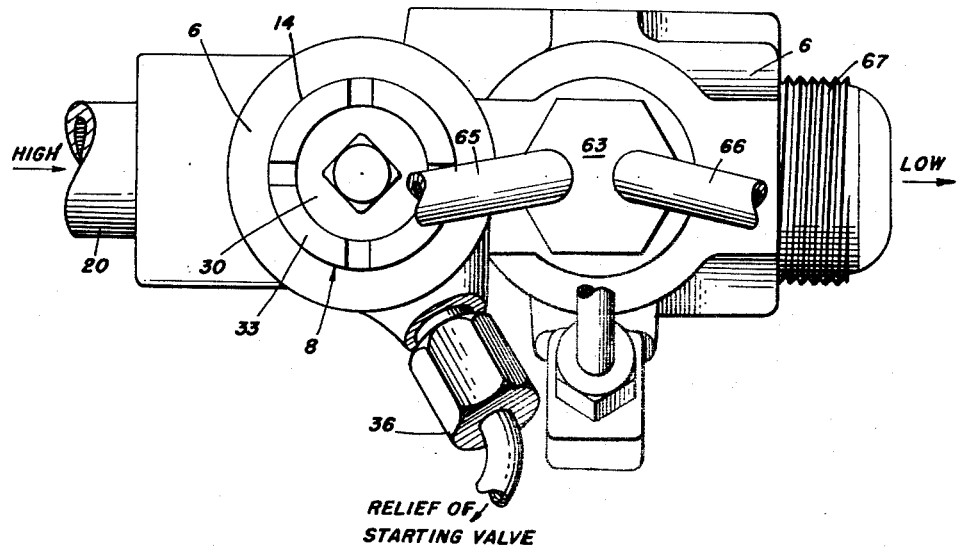
Fig. 2 is a view of the regulator from the upper end as shown in Fig. 1.
Figure 3:
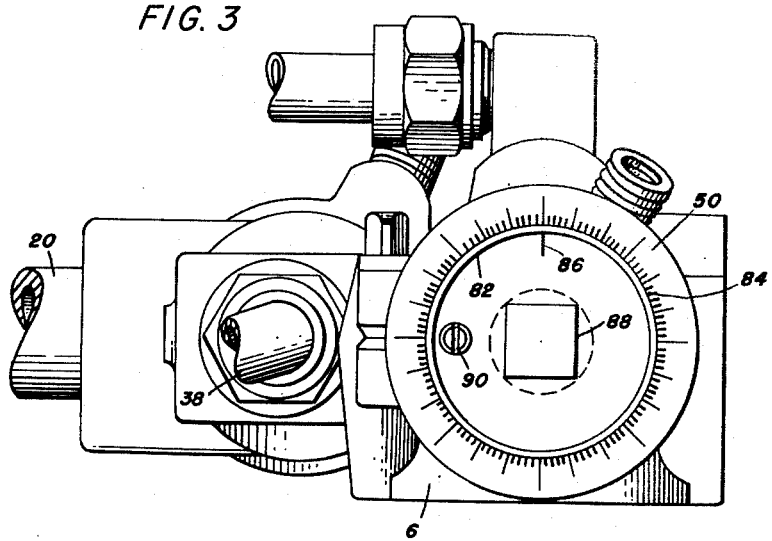
Fig. 3 is a view of the regulator from the lower end as shown in Fig. 1.

Extending laterally from the valve body 6 (Fig. 2) and communicating with the starting valve chamber 32 is a passage connected by a discharge pipe 36 with a starting gear. This starting valve of a torpedo opens automatically when the starting gear is tripped as it opens or connects the pipe 36 to exhaust or discharge. The starting gear is tripped when the torpedo is launched and high pressure air is exhausted from the chamber 32. This permits the valve to be lifted from its bottom seat 16, to engage the upper seats 34 and 35, and to allow high pressure air to flow into the chamber 22 and thence to the regulating valve. From this chamber 22 high pressure air is also conducted to the starting gear and to the gyro spinning mechanism by a pipe connection 38.

The regulating valve 10 is slidably mounted in a sleeve 40 fixed in an opening 41 of the valve body which is a reduction in size from an end opening 42 and extends across the high pressure air chamber 22 and into a reduced air pressure chamber 44. This end of the cylinder has a shoulder 45 which abuts a partition 46 between the chambers and the cylinder is pressed tightly against the partition by a hollow pilot valve housing 48 which is movable in the end opening 42. An outer sleeve extension 50 of the valve body is threaded thereon and the inside forms an extension of the end opening 42. The valve housing 48 is threaded at the inside of the extension 50 and the inner end engages the end of the sleeve 40.

Close to the end of the sleeve 40, the head of the regulating valve 10 has a groove with a sharply inclined side 51 to provide an air cut-off with the end of the sleeve, and a longer side 52 directly opposite a number of openings 54 through the sleeve 40 to communicate directly with the high pressure chamber 22. In the stem of valve 10 is a hollow chamber 55 open at the remote end and having a passage 56 at its inner end extending through the valve in the longer side 52 of the groove. Between the end of the valve 10 and the pilot valve 12 is a space 58 which communicates with chamber 55 and as soon as the starting valve is opened pressure builds up almost instantly in the chamber 55 and space 58 forcing the regulating valve off its seat allowing air to enter the chamber 44.

Movement of the valve 10 is opposed by a coil spring 60 seated in a recess 61 in the end of the valve and engaging a centering projection 62 extending from a plug 63 threaded into an opening 64 in the side of the chamber 44. Connected in the plug are pipes 65 and 66 for supplying air under reduced pressure from the chamber 44 for any desired use. In a torpedo these pipes provide connections for the fuel flask, steering and depth engines, the igniter and the like. At another location a pipe connecting sleeve 67 is threaded into the chamber 44 and provides means for making a pipe connection to the combustion chamber.

Extending from the reduced pressure chamber 44 at one side of the opening 41 is a passage 68 which extends into the larger end opening 42 closed at the outer end by the pilot valve housing 48. A chamber 69 is provided surrounding the inner end of the valve housing by a reduced portion 70 and passages 71 through this portion connect the chamber with the interior of the housing 48 in the space around a conical extremity 72 of the pilot valve 12. A valve seat 73 is held on a shouldered projection in the end of the valve housing 48 and has an orifice 74 closed from the inside by the conical extremity 72 of the pilot valve.

A valve stem 75 has a rounded head 77 engaging the pilot valve and the stem is slidable in an adjusting sleeve 76 threaded in housing 48. Around the stem is an extended coil spring 78 which bears at one end against the head and at the other end against the end of the sleeve 76. Pressure of air in the chamber 69 is applied to the conical extremity of the pilot valve 12 which fits slidably in the inner bore of housing 48, and may be sufficient to raise the valve from its seat 73 against the tension of its spring 78.

To adjust the tension of spring 78, and thus to vary the reduced air pressure, the adjusting sleeve 76 has an enlarged and threaded outer end 80 which is rotatable in a correspondingly threaded inner portion at the outer end of the housing 48. A dial 82 projects outwardly from the outer end of the sleeve 76 but preferably is of a diameter to fit within the extension sleeve 50. In the outer end of the sleeve extension 50 are graduations 84 and in the outer face of the dial is at least one line 86 for comparison with and movement relative to the graduations 84. At the outer end of the sleeve 76, outside of the dial, is a nut projection 88 for turning the sleeve by means of a wrench if necessary. Extending through the dial is a set screw 90 movable to engage the outer end of the valve housing 48 to hold the dial and the sleeve 76 in any adjusted position.

In the operation of this construction high pressure air is supplied through the starting valve 8 to the regulating valve 10 where a portion of the air passes through the passage 56 and the central chamber 55 to the end space 58 where pressure is built up almost instantaneously forcing the regulating valve from its seat and admitting air to the reduced pressure chamber 44.

From chamber 44 a portion of the air flows through the passage 68 to the chamber 69 and thence through passages 71 to the space around the conical extremity 72 of the pilot valve 12 in the housing 48. As the pressure of this air increases it overcomes the pressure of the pilot valve spring 78 and forces the valve from its seat 73 and opening its orifice 74. High pressure air is thus admitted through this orifice 74 aiding in unseating the pilot valve and mixing with the reduced pressure air admitted through the passage 68.

The reduction of air pressure under the regulating valve 10 will allow this valve to close under action of its spring 60 or to restrict the flow of air into the reduced air chambers 44 and 69. This consequent reduction of pressure in the reduced air chambers, due to the decrease of the flow of air through the regulating valve 10 decreases the air pressure applied to the pilot valve conical extremity 72, and the pressure of its spring 78 will overcome the air pressure against the extremity, seating the valve and closing the orifice 74.

As the pilot valve is seated, the pressure in the space 58 builds up, again opening the regulating valve 10, and repeating the cycle until an equilibrium is established for the particular pilot valve spring setting. To set the reducing valve for the delivery of the desired reduced pressure the adjusting sleeve 76 is set by rotating it with respect to the sleeve 50 and holding it in adjusted position by the set screw.

In a torpedo, the reducing valve is one of the most important units, for its function is to reduce the stored volume of very high pressure air to the reduced operating pressure, to force liquids into the combustion pot, to fire the igniter, and to operate the various control mechanisms.

In this design of the pilot valve, a slight unbalance of pressure may exist over the operating range with a varying supply pressure. By making the diameter of the valve orifice 74 small compared to the diameter of the pilot valve stem 75, this unbalance may be kept to within one percent or less. This unbalance is also compensated by movement of the pilot valve with varying leakage flow. The pressure balance theoretically causes pressure rise with falling supply pressure, and may be purposely used to counteract any pressure drop encountered.

If desired, this design could provide for a rising pressure characteristic with reduced supply pressure by making the pilot valve orifice 74 larger or increasing the differential area of the valve head and the stem. A falling pressure characteristic could be provided by a strong spring 78 opposing the valve opening, or by decreasing the differential area of the valve head and the stem.

By making the head of the reducing valve 10 of the same diameter as the valve seat, the extremity of the sleeve 40, the entire regulating and pilot valve assembly may be removed from the valve body; and with the pilot valve assembly removed, the regulating valve 10 may be removed from the sleeve 40 or together with it.

Although this invention has been described as it might be applied to a torpedo, it may be used in various other ways where it is desirable to reduce high pressure to a lower usable pressure, and this disclosure should not be regarded as a restriction or limitation of the use and structure described, as various changes in the construction, combination and arrangement of the parts may be made without departing from the spirit and scope of the invention.

I claim:

In a fluid pressure regulator, an elongate valve body having a low pressure chamber in one end portion provided with a discharge outlet, a high pressure chamber adjacent the low pressure chamber and separated therefrom by a partition, an opening extending longitudinally of the valve body from the opposite end portion thereof through said high pressure chamber and partition into said low pressure chamber, said opening defining a pilot valve chamber in the opposite end portion of said valve body, a reducing valve sleeve fitted in said opening intermediate said end portions and being provided with a lateral aperture admitting fluid from said high pressure chamber, said sleeve terminating at one end in a reducing valve port communicating with said low pressure chamber and at its opposite end in an annular shoulder, a reciprocable reducing valve including a stem portion guided for axial movement within the sleeve and a head portion in the low pressure chamber movable into and out of engagement with said reducing valve port, said stem portion including a circumferential groove adjacent said head portion to receive high pressure fluid entering the sleeve through said aperture and terminating in an end portion adjacent said pilot valve chamber, said stem being provided with a pressure control pocket axially extending into said stem end portion and a constricted passage between said pocket and said groove, a pilot valve sleeve fitted in said pilot valve chamber and terminating in an inner end wall engaging said annular shoulder, said end wall being provided with a restricted orifice constituting the sole passage between said stem pocket and said pilot valve chamber, said pilot valve sleeve being provided with a lateral duct adjacent said inner end wall, and said valve body being provided with a longitudinal duct extending between said low pressure chamber and said lateral duct, a conical pilot valve reciprocably movable in said pilot valve sleeve for controlling fluid flow through said orifice between said pressure control pocket and said low pressure chamber, said pilot valve being responsive to outlet pressure, and springs biasing said pilot valve and said reducing valve toward closed positions whereby said reducing valve opens into said low pressure chamber against the force of its biasing spring responsive to accumulation of a predetermined pressure in said stem pocket and said pilot valve opens upon the transmission of a predetermined outlet pressure from said low pressure chamber into said pilot valve sleeve, said reducing valve sleeve and said pilot valve sleeve end wall forming a dashpot cushioning closing movement of said reducing valve.

HORACE E. KARIG.

REFERENCES CITED

The following references are of record in the file of this patent:

UNITED STATES PATENTS

| Number | Name | Date |
| --- | --- | --- |
| 527,575 | Wood | Oct. 16, 1894 |
| 836,306 | Cunning | Nov. 20, 1906 |
| 937,774 | Cunning | Oct. 26, 1909 |
| 1,098,616 | Creveling | June 2, 1914 |
| 1,461,248 | McConnell | July 10, 1923 |